United States Patent
Wang

(10) Patent No.: US 9,337,578 B2
(45) Date of Patent: May 10, 2016

(54) QUICK EJECTING CARD CONNECTOR

(71) Applicant: Advanced-Connectek Inc., New Taipei (TW)

(72) Inventor: Hsu-Fen Wang, New Taipei (TW)

(73) Assignee: Advanced-Connectek Inc., New Taipei (TW)

( * ) Notice: Subject to any disclaimer, the term of this patent is extended or adjusted under 35 U.S.C. 154(b) by 0 days.

(21) Appl. No.: 14/695,969

(22) Filed: Apr. 24, 2015

(65) Prior Publication Data

US 2015/0333444 A1    Nov. 19, 2015

(30) Foreign Application Priority Data

May 13, 2014    (TW) .............................. 103208331 U

(51) Int. Cl.
    *H01R 13/62* (2006.01)
    *H01R 13/633* (2006.01)
    *H01R 12/72* (2011.01)

(52) U.S. Cl.
    CPC .............. *H01R 13/633* (2013.01); *H01R 12/72* (2013.01)

(58) Field of Classification Search
    CPC .. H01R 12/72; H01R 13/633; H01R 13/6335; H01R 13/635
    USPC ................................................ 439/159, 160
    See application file for complete search history.

(56) References Cited

U.S. PATENT DOCUMENTS

| | | | | |
|---|---|---|---|---|
| 6,027,350 A * | 2/2000 | Chen | .................... | H01R 13/633 439/159 |
| 6,120,309 A * | 9/2000 | Hara | ................... | H01R 13/6335 439/157 |
| 8,740,635 B2 * | 6/2014 | Lim | ........................ | G06K 13/08 439/159 |
| 8,968,029 B2 * | 3/2015 | Yun | ....................... | H01R 12/714 439/159 |
| 9,142,918 B2 * | 9/2015 | Zhang | ................ | G06K 13/0812 |

* cited by examiner

*Primary Examiner* — Khiem Nguyen
(74) *Attorney, Agent, or Firm* — C. G. Mersereau; Nikolai & Mersereeau, P.A.

(57) ABSTRACT

A quick ejecting card connector has an insulative housing, an auto ejecting assembly and a tray. The insulative housing has a cavity, a front opening and multiple terminals. The auto ejecting assembly is mounted on the insulative housing and has a locking lever, a resilient locking element and a resilient card ejecting element. The locking lever is mounted pivotally on the insulative housing and has a locking hook. The tray is mounted slidably in the cavity and has a locking hole selectively engaged with the locking hook of the locking lever to lock the completely inserted tray. When the locking hook of the lock lever is disengaged from the locking hole of the tray, the resilient card ejecting element ejects the tray and an electrical card thereon out of the front opening. The insertion and ejection of the tray and the electrical card are implemented without any assistant tools.

9 Claims, 6 Drawing Sheets

QUICK EJECTING CARD CONNECTOR

BACKGROUND OF THE INVENTION

1. Field of the Invention

The present invention relates to a card connector, and more particularly to a quick ejecting card connector that allows a subscriber identity module (SIM) card or memory card to be inserted therein and ejects the SIM card or memory card without assistant ejection tools.

2. Description of Related Art

Current portable electrical devices such as smart phones, tablets or digital cameras are equipped with card connectors for receiving electrical cards such as SIM cards or memory cards such that the cards provide the electrical devices with telecommunication function or data storage function.

A conventional card connector has a base, multiple terminals and a tray. The base has an ejection mechanism and an ejecting hole. The terminals are mounted on the base. The tray is slidably mounted on the base and is able to receive an electrical card. To use the card connector, an electrical card with multiple contacts is installed in the tray and the card is put in the base such that the contacts of the electrical card respectively contact the terminals for signal and power transmission. To eject the electrical card, an assistant ejection pin is hand held and inserted into the ejecting hole for activating the ejection mechanism. The electrical card is ejected by the ejection mechanism.

However, users usually carry electrical devices outside without the ejection pin such that the users need look for a substitute for the ejection pin once the electrical card should be uninstalled or replaced.

To overcome the shortcomings, the present invention provides a quick ejecting card connector to mitigate or obviate the aforementioned problems.

SUMMARY OF THE INVENTION

The main objective of the invention is to provide a quick ejecting card connector that allows a SIM card or memory card to be inserted therein and ejects the SIM card or memory card without assistant ejection tools.

A quick ejecting card connector in accordance with the present invention comprises an insulative housing, an auto ejecting assembly and a tray. The insulative housing has a cavity, a front opening and multiple terminals. The auto ejecting assembly is mounted on the insulative housing and has a locking lever, a resilient locking element and a resilient card ejecting element. The locking lever is mounted pivotally on the insulative housing and has a locking hook. The tray is mounted slidably in the cavity and has a locking hole selectively engaged with the locking hook of the locking lever to lock the completely inserted tray. When the locking hook of the lock lever is disengaged from the locking hole of the tray, the resilient card ejecting element ejects the tray and an electrical card thereon out of the front opening. The insertion and ejection of the tray and the electrical card are implemented without any assistant tools.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
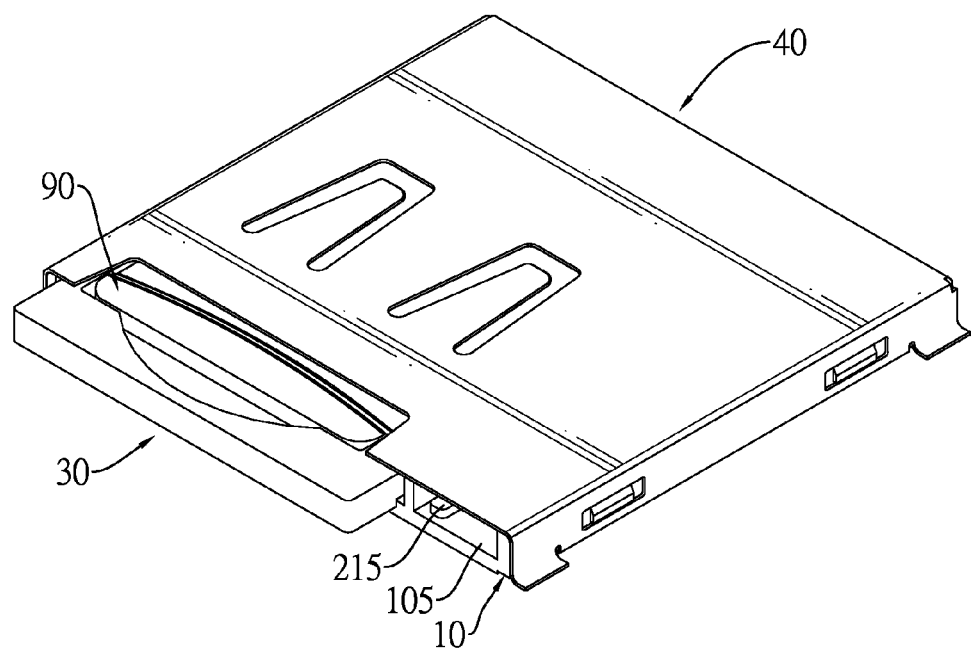
FIG. 1 is a perspective view of a first embodiment of a quick ejecting card connector in accordance with the present invention with an electrical card.
Figure 2:
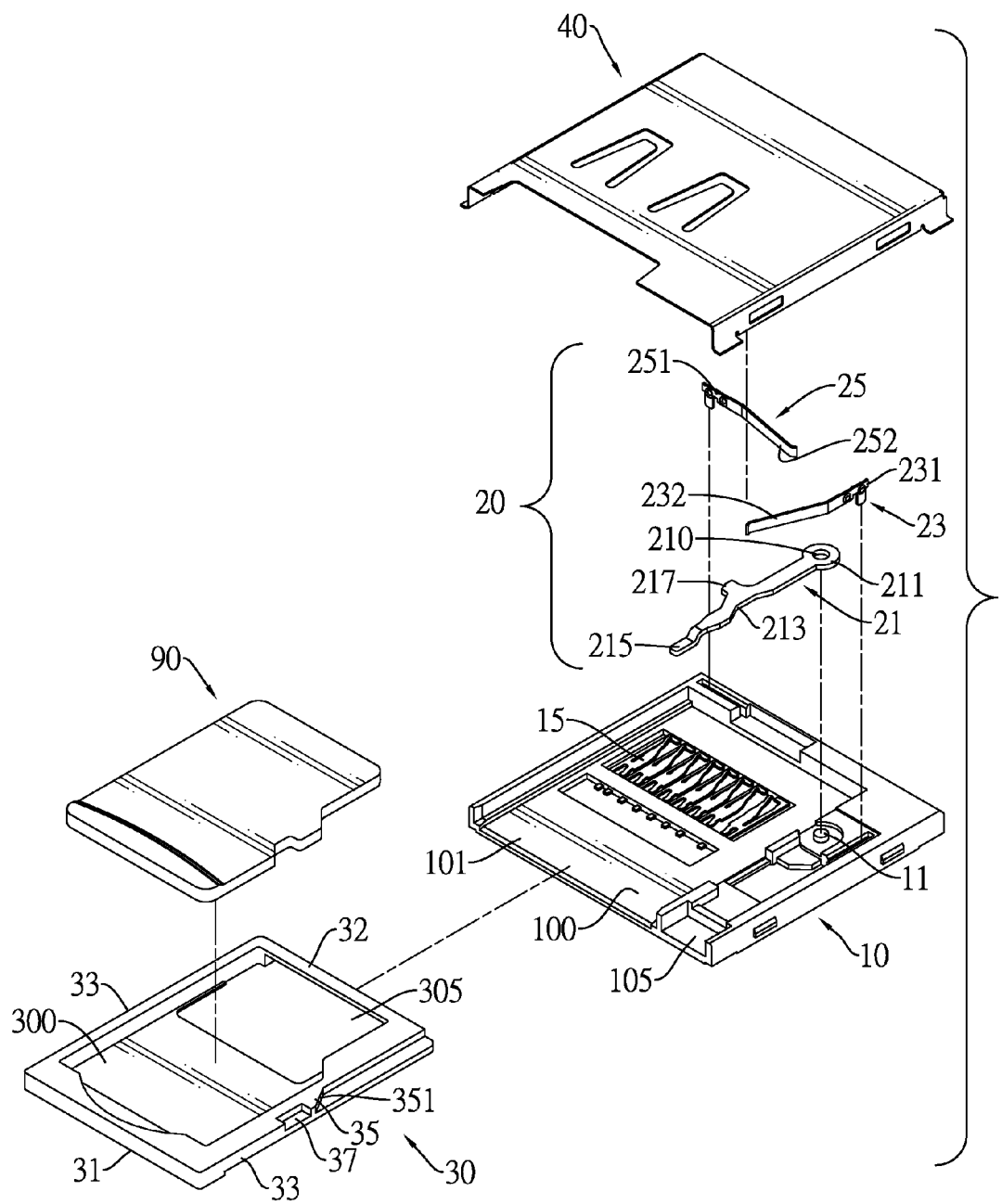
FIG. 2 is an exploded perspective view of the quick ejecting card connector with the electrical card in FIG. 1.

With reference to FIGS. 1 and 2, a first embodiment of a quick ejecting card connector in accordance with the present invention may receive an electrical card 90 and comprises an insulative housing 10, an auto ejecting assembly 20, a tray 30 and a shell 40.

The insulative housing 10 has a cavity 100, a front opening 101 and multiple terminals 15 and may further have a pivot pin 11 and a manipulating hole 105. The cavity 100 is defined in the insulative housing 10. The front opening 101 is defined in a front end of the insulative housing 10 and communicates with the cavity 100. The terminals 15 are mounted on the insulative housing 10 and extend in the cavity 100. The pivot pin 11 is formed on and protrudes from the insulative housing 10. The manipulating hole 105 is defined in the front end of the insulative housing adjacent to the front opening 101.

The auto ejecting assembly 20 is mounted on the insulative housing 10 and has a locking lever 21, a resilient locking element 23 and a resilient card ejecting element 25.

Figure 3:
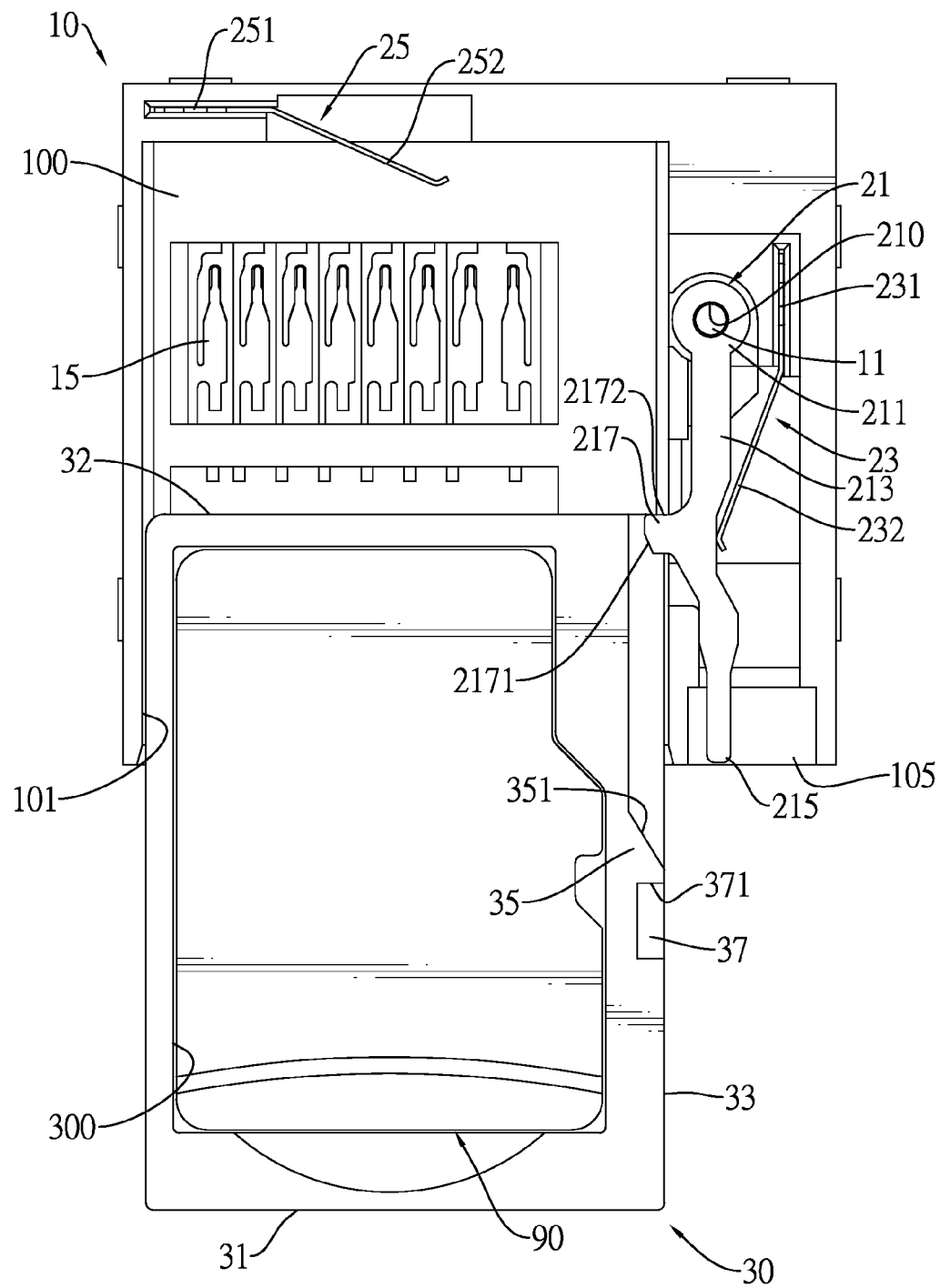
FIG. 3 is a top view of the quick ejecting card connector with the electrical card in FIG. 1, wherein a shell is omitted.

With further reference to FIG. 3, the locking lever 21 is mounted pivotally on the insulative housing 10 and has a locking hook 217 and may further have a connecting member 211, a lever member 213 and a manipulating member 215. The locking hook 217 is formed on and protrudes laterally from the locking lever 21, selectively extends laterally in or moves laterally out of the cavity 100 and has a locking surface 2172 and an inclined guiding surface 2171. The inclined guiding surface 2171 is substantially opposite to the locking surface 2172. The connecting member 211 is mounted rotatably on the insulative housing 10 and has a pivot hole 210 defined through the connecting member 211 and mounted rotatably around the pivot pin 11. The lever member 213 is formed on and protrudes from the connecting member 211, and the locking hook 217 is formed on and protrudes laterally from the lever member 213. The manipulating member 215 is formed on and protrudes longitudinally from the lever member 213 and extends in the manipulating hole 105. A user may drive the manipulating member 215 to pivot the locking lever 21 by a finger.

The resilient locking element 23 is mounted on the insulative housing 10 and presses against and biases the locking lever 21 toward the cavity 100 such that the locking hook 217 extends in the cavity 100 in a predetermined condition without any external force. The resilient locking element 23 has a mounting member 231 and a resilient member 232. The mounting member 231 is mounted securely on the insulative housing 10. The resilient member 232 is formed on and protrudes from the mounting member 231 and presses against the locking lever 21.

The resilient card ejecting element 25 is mounted on the insulative housing 10, extends in the cavity 100 and is located at an inner end of the cavity 100 that is opposite to the front opening 101. The resilient card ejecting element 25 has a mounting section 251 and a resilient section 252. The mounting section 251 is mounted securely on the insulative housing 10. The resilient section 252 is formed on and protrudes from the mounting section 251 and extends in the cavity 100.

The tray 30 is mounted slidably in the cavity 100 of the insulative housing 10 through the front opening 101, selectively presses against the resilient section 252 of the resilient card ejecting element 25 and has a card slot 300, a locking hole 37 and a guiding bevel 35.

The card slot 300 is defined in the tray 30 for receiving the electrical card 90 and may further have a through hole 305. The through hole 305 is defined through the tray 30, communicates with the card slot 300 and corresponds to the terminals 15. When the tray 30 slides completely in the cavity 100, the terminals 15 extend through the through hole 305 in the card slot 300.

The locking hole 37 is defined laterally in one of two opposite sides 33 of the tray 30, is selectively engaged with the locking hook 217 of the locking lever 21 and has an abutment surface 371. The abutment surface 371 faces the front opening 101, is perpendicular to a sliding path of the tray 30 and selectively abuts the locking surface 2172 of the locking hook 217 of the locking lever 21. When the locking hook 217 is engaged with the locking hole 37, the locking surface 2172 is parallel to and abuts the abutment surface 371.

The guiding bevel 35 is formed on and protrudes laterally from one side 33 of the tray 30, selectively contacts the locking hook 217 of the locking lever 21 and has an sloped guiding surface 351 selectively contacts and slides relatively to the inclined guiding surface 2171 of the locking hook 217.

In a preferred embodiment, a width between the two sides of the tray 30 is uniform from an inner end 32 to an outer end 31 of the tray 30, and the width of the tray 30 is substantially equal to a width of the cavity 100. The uniform width of the tray 30 and the corresponding widths of the tray 30 and cavity 100 prevent the tray 30 from being inclined and jammed in the cavity 100 during an insertion or ejection procedure.

The through hole 305 is defined through the tray

The shell 40 is mounted on the insulative housing 10 and covers the cavity 100.

Figure 4:
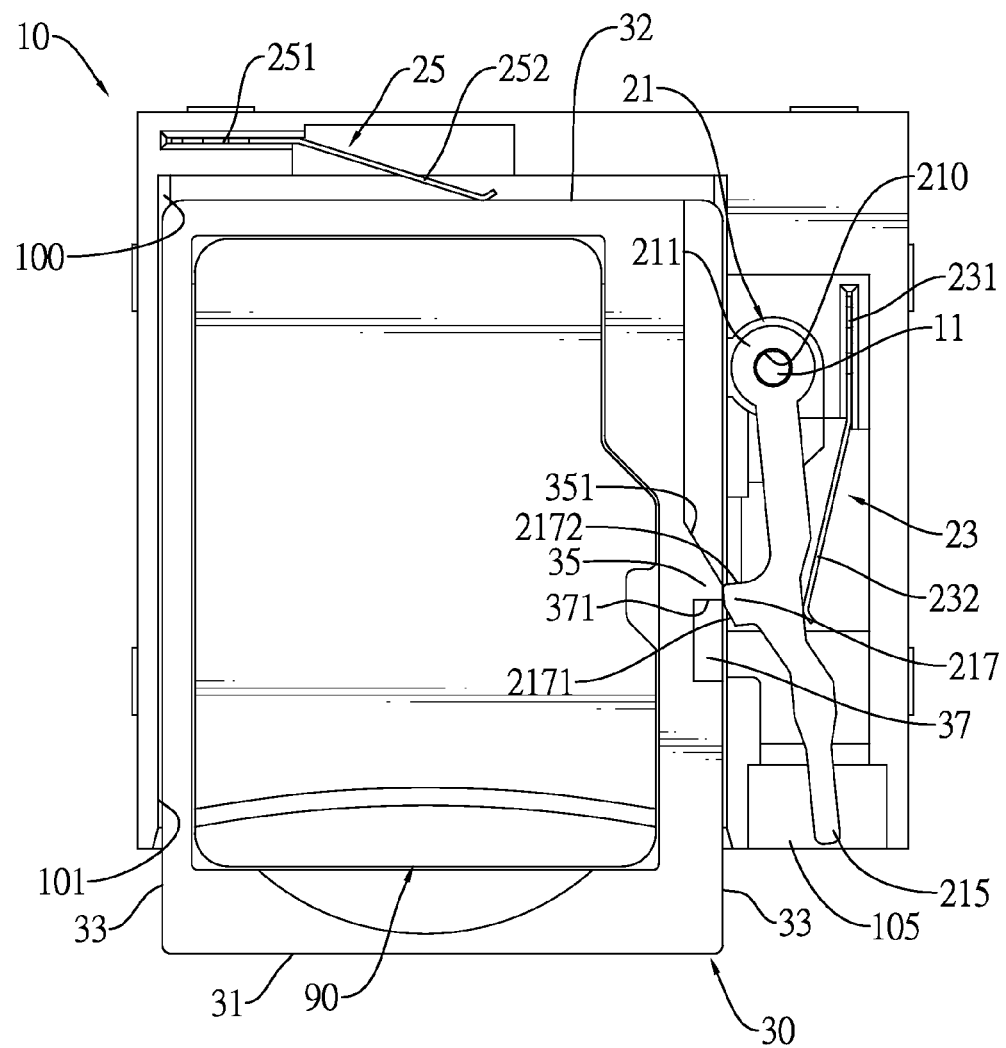
FIG. 4 is an operational top view of the quick ejecting card connector with the electrical card in FIG. 3, wherein the shell is omitted.

With further reference to FIGS. 3 and 4, when the tray is inserted in the cavity 100 of the insulative housing 10 halfway, the inclined guiding surface 2171 of the locking hook 217 of the locking lever 21 contacts and slides relative to the sloped guiding surface 351 of the guiding bevel 35 such that the tray 30 smoothly slides relative to the locking hook 217 into the cavity 100 without being jammed.

Figure 5:
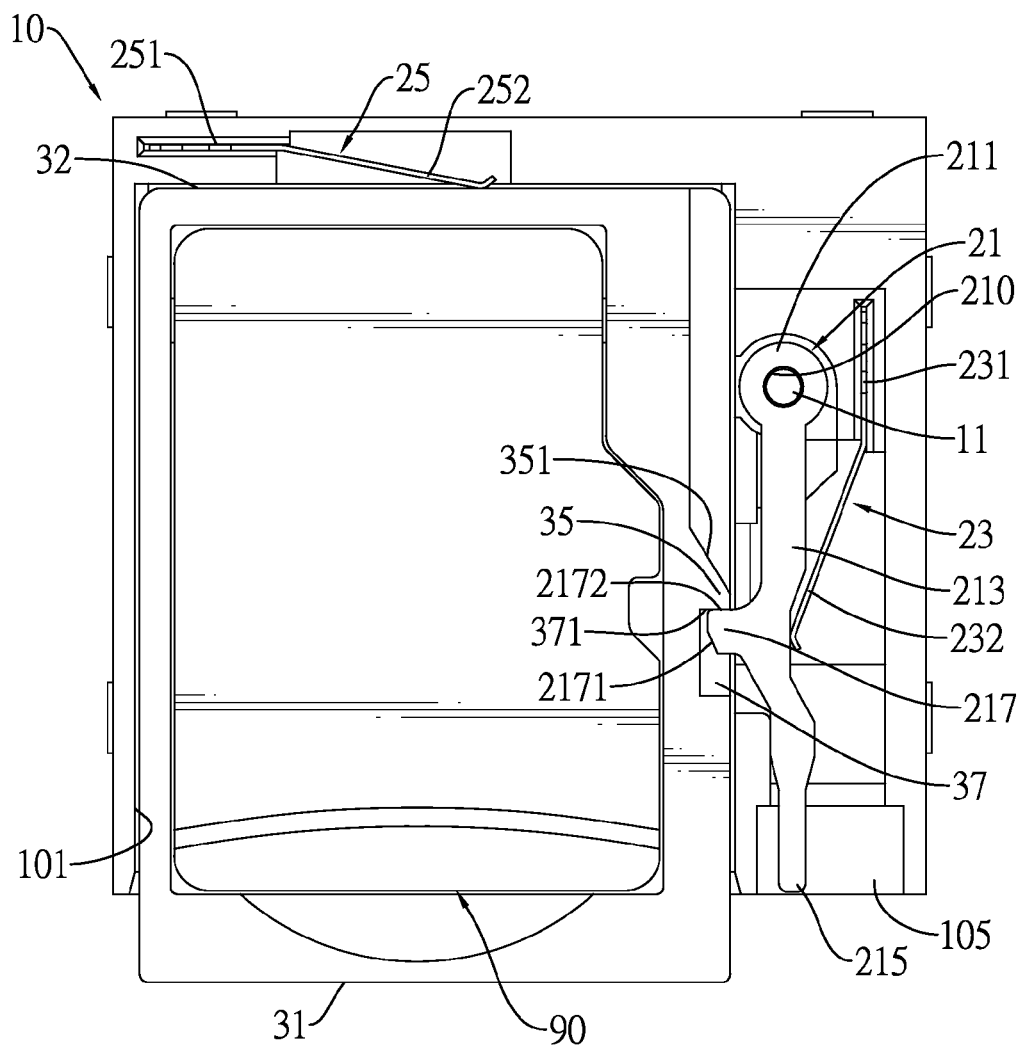
FIG. 5 is an operational top view of the quick ejecting card connector with the electrical card in FIG. 4, wherein the shell is omitted.

With further reference to FIG. 5, when the tray 30 slides completely in the cavity 100, the locking hook 217 is engaged with the locking hole 37 such that the tray 30 is locked securely in the cavity 100 and cannot be ejected out through the front opening 101. Manually pivoting the locking lever 21 against resilient force of the resilient locking element 23 disengages the locking hook 217 from the locking hole 37 and the resilient card ejecting element 25 presses against and ejects the tray 30 out through the front opening 101 of the insulative housing 10.

Figure 6:
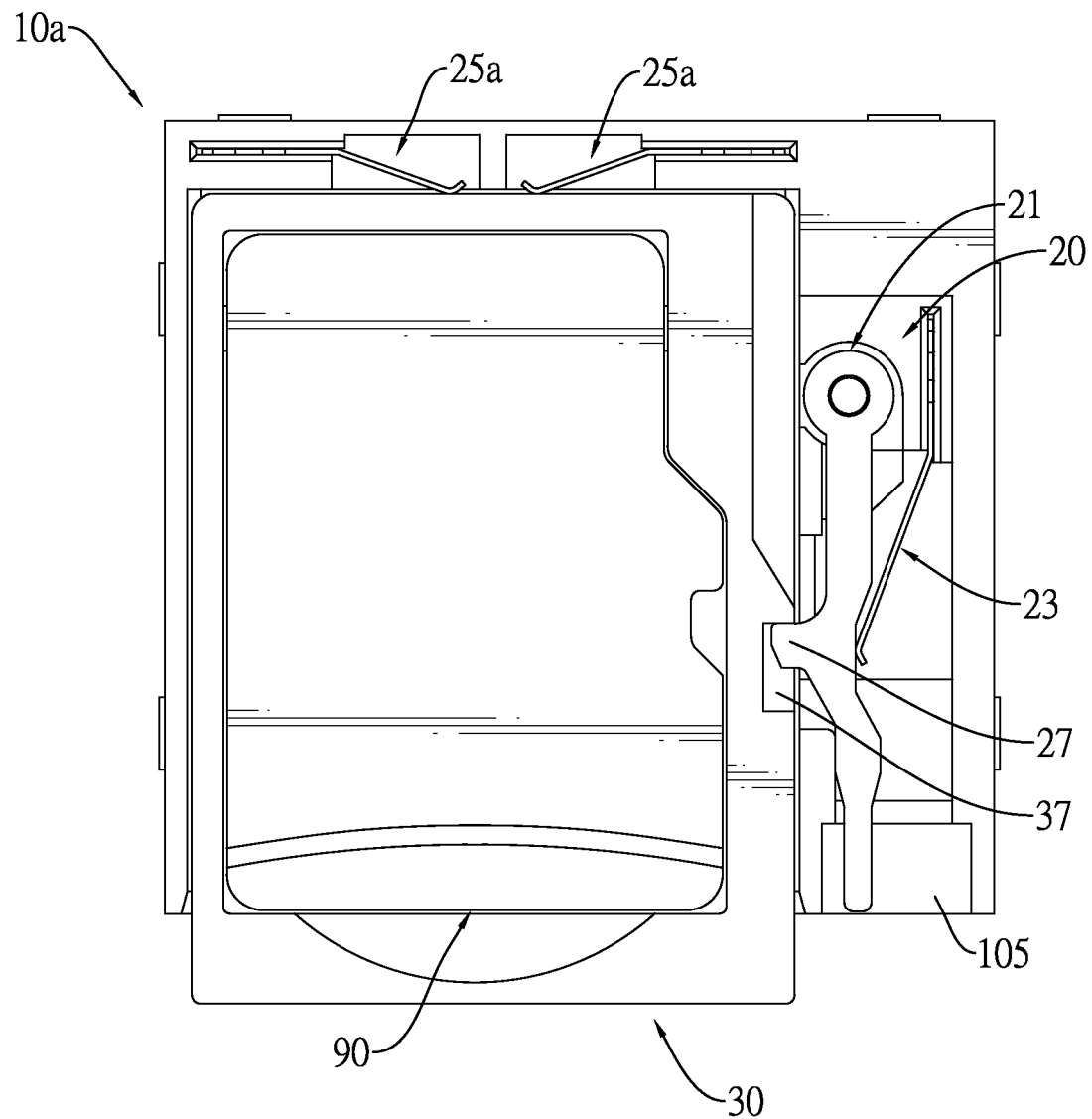
FIG. 6 is a top view of a second embodiment of the quick ejecting card connector in accordance with the present invention with an electrical card, where a shell is omitted.

With further reference to FIG. 6, a second embodiment of the quick ejecting card connector in accordance with the present invention comprises two resilient card ejecting elements 25a mounted on the insulative housing 10a.

The quick ejecting card connector in accordance with the present invention has the following advantages.

1. The auto ejecting assembly 20 automatically locks the tray 30 with the electrical card 90 such as a SIM card or a memory card inserted by a user. By manually pivoting the locking lever 21 against resilient force of the resilient locking element 23, the locking hook 217 is disengaged from the locking hole 37 and the resilient card ejecting element 25 presses against and automatically ejects the tray 30 and makes the outer end 31 of the tray 30 extend out through the front opening 101 of the insulative housing 10. The user may detach the tray 30 for replacing the electrical card 90. Therefore, insertion and ejection of the electrical card 90 on the quick ejecting card connector are both implemented without any assistant tools such as ejection pins. Electrical devices with the aforementioned quick ejecting card connector are therefore convenient and useful.

2. The uniform width of the tray 30 and the corresponding widths of the tray 30 and cavity 100 prevent the tray 30 from being inclined and jammed in the cavity 100 during an insertion or ejection procedure.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A quick ejecting card connector comprising:
    an insulative housing having
        a cavity defined in the insulative housing;
        a front opening defined in a front end of the insulative housing and communicating with the cavity; and
        multiple terminals mounted on the insulative housing and extending in the cavity;
    an auto ejecting assembly mounted on the insulative housing and having
        a locking lever mounted pivotally on the insulative housing and having a locking hook formed on and protruding laterally from the locking lever and selectively extending laterally in or moving laterally out of the cavity;
        a resilient locking element mounted on the insulative housing and pressing against and biasing the locking lever toward the cavity such that the locking hook extends in the cavity in a predetermined condition; and
        a resilient card ejecting element mounted on the insulative housing, extending in the cavity and located at an inner end of the cavity that is opposite to the front opening; and
    a tray mounted slidably in the cavity of the insulative housing through the front opening, selectively pressing against the resilient card ejecting element and having a locking hole defined laterally in one of two opposite sides of the tray and selectively engaged with the locking hook of the locking lever;
    wherein when the tray slides completely in the cavity of the insulative housing, the locking hook is engaged with the locking hole to securely lock the tray in the cavity; pivoting the locking lever disengages the locking hook from the locking hole, and the resilient card ejecting element ejects the tray.

2. The quick ejecting card connector as claimed in claim 1, wherein
    the locking hook of the locking lever has a locking surface; and the locking hole of the tray has an abutment surface facing the front opening, being perpendicular to a sliding path of the tray and selectively abutting the locking surface of the locking hook of the locking lever.

3. The quick ejecting card connector as claimed in claim 2, wherein
the locking hook of the locking lever has an inclined guiding surface being substantially opposite to the locking surface; and
the tray has a guiding bevel formed on and protruding laterally from one side of the tray, selectively contacting the locking hook of the locking lever and having an sloped guiding surface selectively contacting and sliding relatively to the inclined guiding surface of the locking hook.

4. The quick ejecting card connector as claimed in claim 3, wherein a width between the two sides of the tray is uniform from an inner end to an outer end of the tray.

5. The quick ejecting card connector as claimed in claim 4, wherein
the insulative housing further has a pivot pin formed on and protruding from the insulative housing; and
the locking lever further has
  a connecting member mounted rotatably on the insulative housing and having a pivot hole defined through the connecting member and mounted rotatably around the pivot pin;
  a lever member formed on and protruding from the connecting member, wherein the locking hook is formed on and protrudes laterally from the lever member; and
  a manipulating member formed on and protruding from the lever member.

6. The quick ejecting card connector as claimed in claim 5, wherein
the insulative housing further has a manipulating hole defined in the front end of the insulative housing adjacent to the front opening; and
the manipulating member of the locking lever extends in the manipulating hole.

7. The quick ejecting card connector as claimed in claim 6, wherein the resilient locking element has
a mounting member mounted securely on the insulative housing; and
a resilient member formed on and protruding from the mounting member and pressing against the locking lever.

8. The quick ejecting card connector as claimed in claim 7, wherein the resilient card ejecting element has
a mounting section mounted securely on the insulative housing; and
a resilient section formed on and protruding from the mounting section and extending in the cavity.

9. The quick ejecting card connector as claimed in claim 8 further comprising a shell mounted on the insulative housing and covering the cavity.

\* \* \* \* \*